United States Patent Office 3,352,380
Patented Nov. 14, 1967

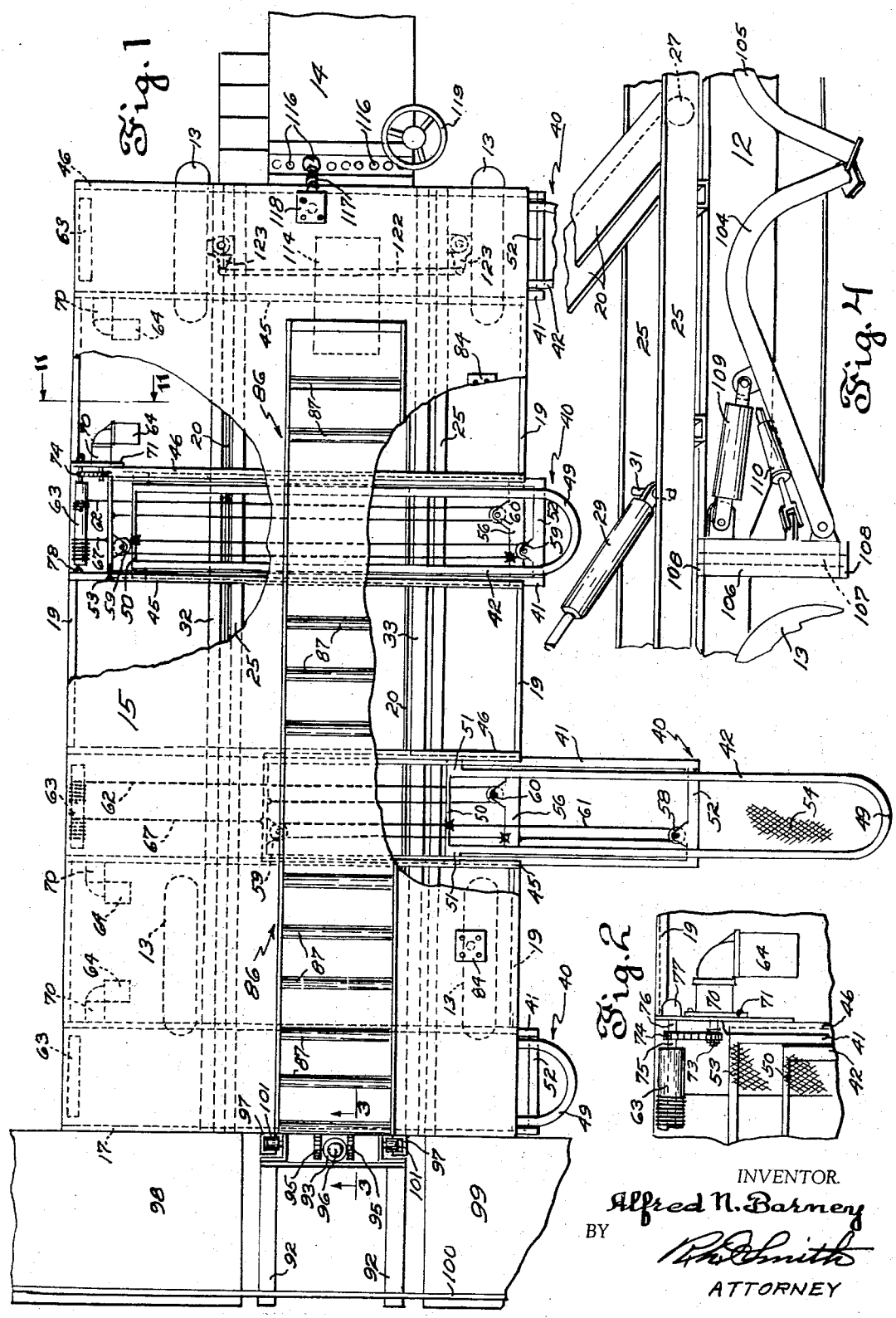

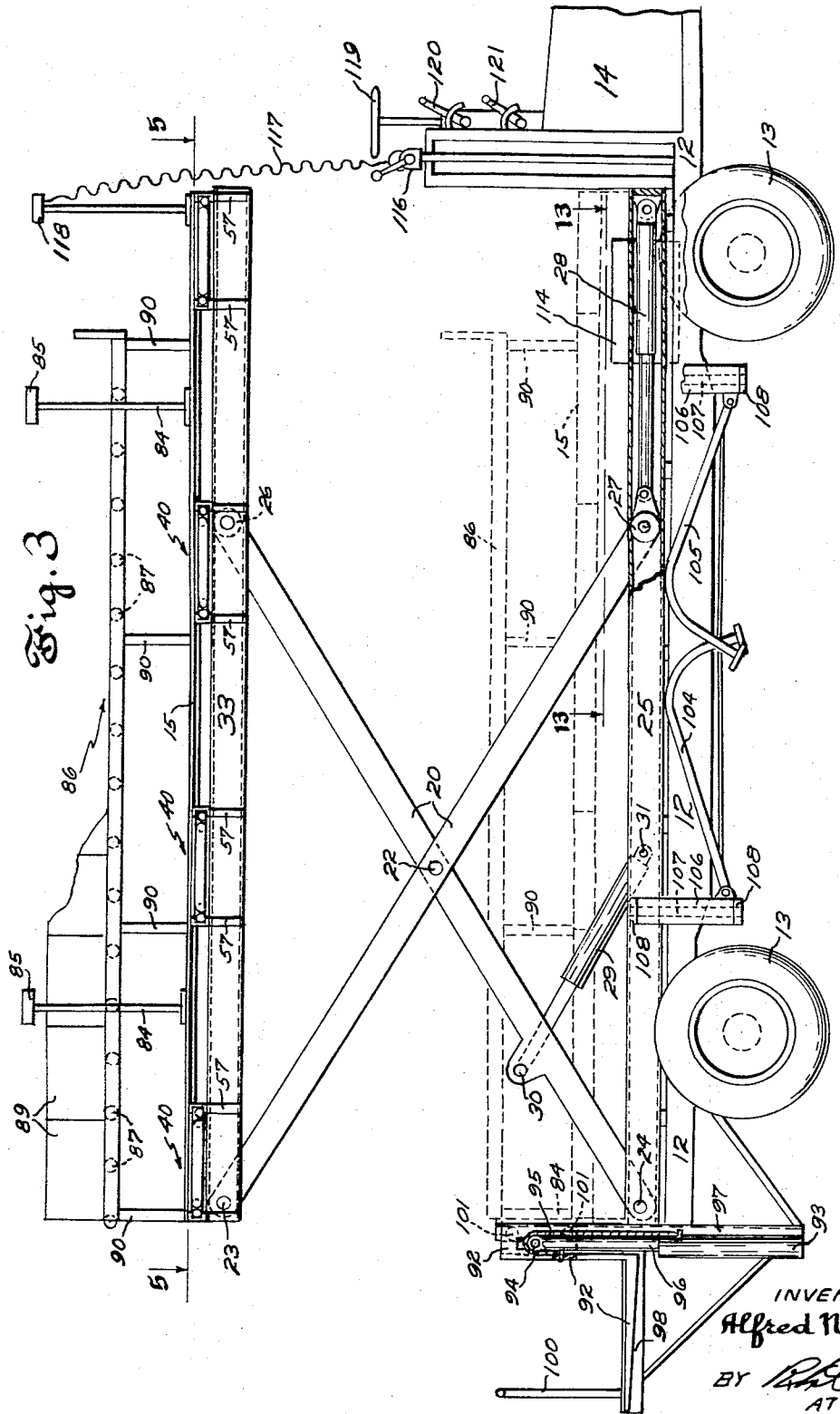

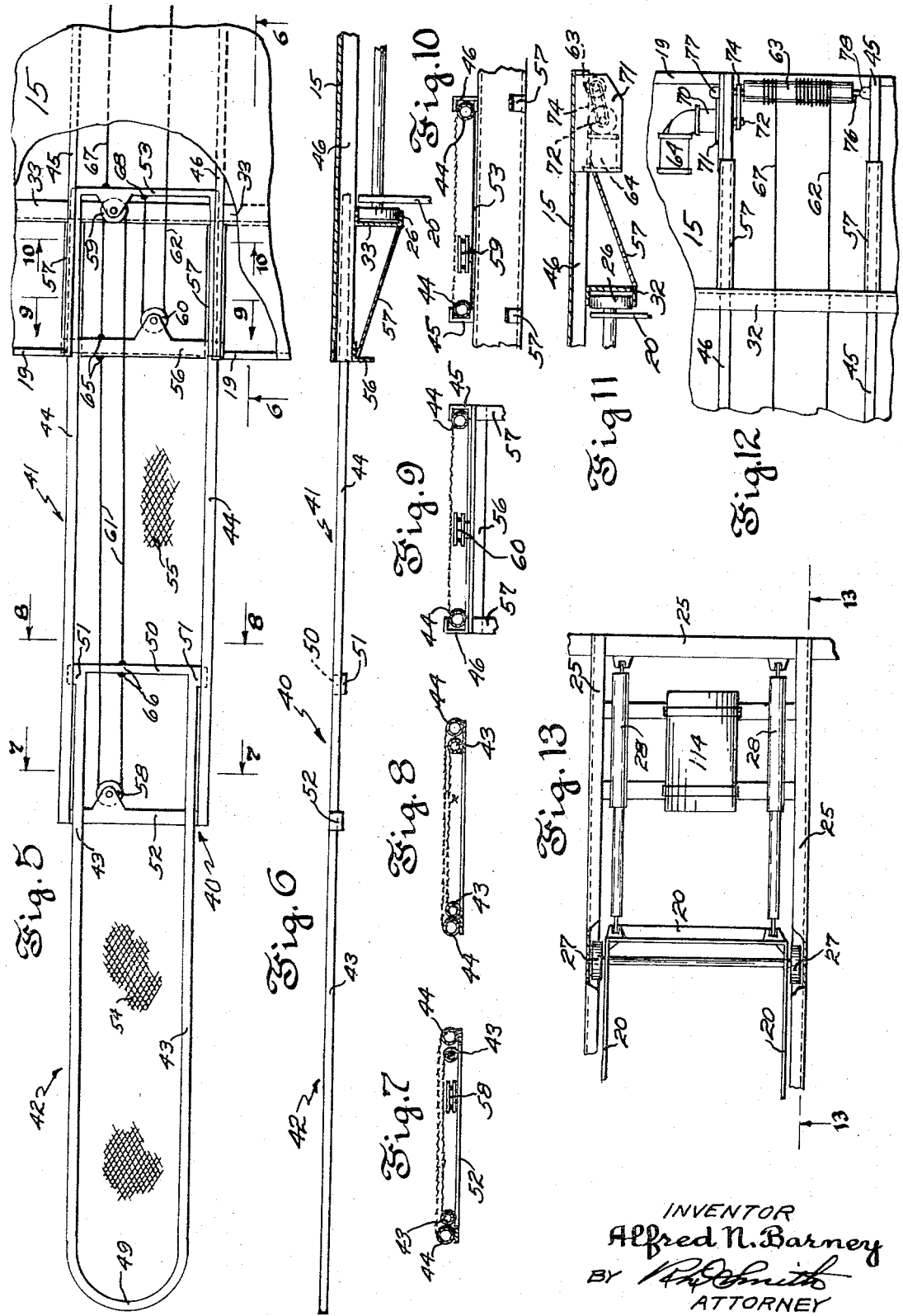

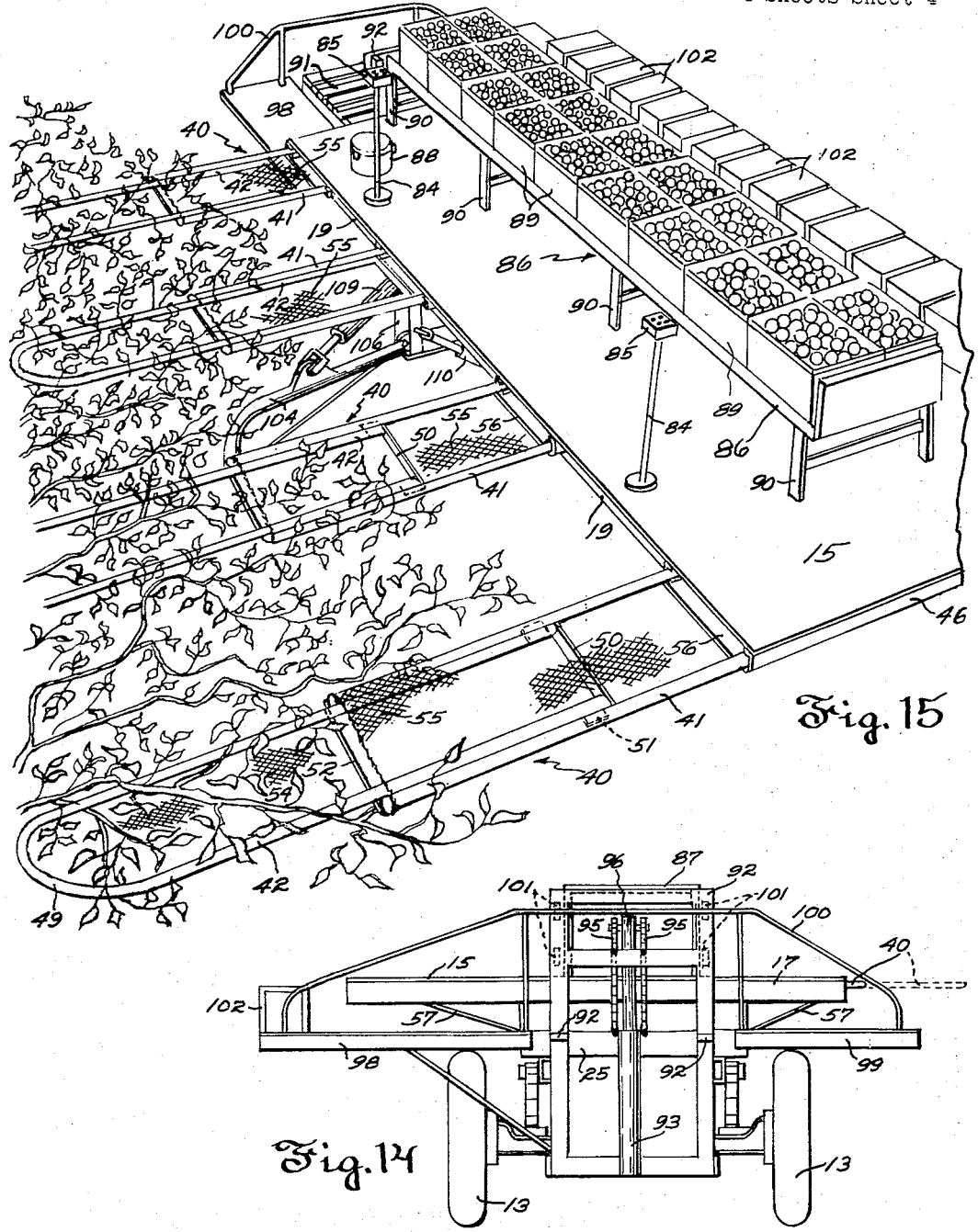

3,352,380
SCAFFOLD WITH CATWALKS FOR PENETRATING TREE FOLIAGE
Alfred N. Barney, 224 Everett Road, Easton, Conn. 06425
Filed Jan. 10, 1966, Ser. No. 519,481
5 Claims. (Cl. 182—131)

ABSTRACT OF THE DISCLOSURE

A truck having mounted thereon an elevatable platform elongated lengthwise of the truck and equipped with retractable, side by side, laterally spaced apart catwalks that can be projected endwise individually from the same side of the platform to selective extents, thereby to penetrate the midst of or flank the foliage of trees of various girths, shapes and spacing in an orchard, whereby to afford simultaneously to a crew of working harvesters, such as fruit pickers, communicating pathways leading from various parts of a tree to a common depository for the fruit gathered therefrom.

This invention relates to a mobile scaffold for use simultaneously by a crew of workmen to perform with improved efficiency certain orchard tending operations such as caring for trees and particularly in the picking of fruit such as apples.

An object of the invention is to provide a mobile means of support that will permit a crew of workmen to walk simultaneously back and forth between a scaffold supported platform and various positions deep in the foliage of a tree on separate catwalks constructed to be extended endwise from a common side of the platform at selective heights into variable depths of penetration of the tree foliage.

Another object is to provide on the chassis carried scaffold, and at the supported or butt ends of such catwalks, a common depository for the fruit as it is being picked, and placed so as to be equally accessible at the same time to all the workmen of the crew.

Another object is to provide power facilities for transporting the accumulation of fruit in said depository to near the level of the ground without damage to the fruit and while the fruit is held in suitable containers for transfer to market.

Another object is to provide a way and means for each of the catwalks to be contractable in length independently of the other catwalks and also to be independently retractable to within the side-to-side confines of the truck chassis so that when the catwalks are withdrawn from their projecting positions the scaffold can be wheeled along to selected stations close to a row or parallel rows of trees and the catwalks then extended individually into the foliage of the tree.

These and related objects of the invention will appear in fuller particular from the following description of a successful embodiment of the improvements having reference to the appended drawings wherein:

FIG. 1 is a plan view of a mobile scaffold embodying the invention showing portions of its elevatable platform broken away to expose a row of immediately underlying side by side, laterally spaced, endwise extensible catwalks.

FIG. 2 is an enlarged view of a portion of FIG. 1 detailing one of the motor drives that extend and withdraw the catwalks individually.

FIG. 3 is a side view of the scaffold with its working platform in elevated position, part of the mechanism for positioning the buttressing props being omitted.

FIG. 4 shows on a larger scale certain hydraulic rams for positioning one of the buttressing props that are omitted in FIG. 3.

FIG. 5 shows one of the catwalks of FIG. 1 in larger detail and fully extended endwise.

FIG. 6 is a view taken in section on the plane 6—6 in FIGS. 1 and 5, looking in the direction of the arrows.

FIGS. 7, 8, 9 and 10 are views taken in section on the respective planes 7—7, 8—8, 9—9 and 10—10 in FIG. 5.

FIG. 11 is a view taken in section on the plane 11—11 in FIG. 1 looking in the direction of the arrows and drawn on the same scale as FIG. 6.

FIG. 12 is a bottom plan view looking upward at FIG. 11.

FIG. 13 is a view looking downward from the plane 13—13 in FIG. 3.

FIG. 14 is a rear end elevation of the entire mobile scaffold and truck chassis on which it is mounted.

FIG. 15 is a perspective view of my improved mobile scaffold positioned for reaching into the foliage of a tree.

The present improvements as shown in the appended drawings are embodied in a mobile scaffold carried on a truck chassis 12 whose road wheels 13 are powered by a conventional automotive engine in the hood compartment 14 arranged also to furnish power for other purposes as hereinafter explained. Superimposed on chassis 12 is an elevatable platform 15 which is somewhat wider than the chassis but not of necessity wider than the gage of an ordinary industrial truck permitted on the highway by most state laws.

Platform 15 boards over and is edged by an open, rectangular framework of angle irons comprising end irons 17 joined by side irons 19. Underlying the platform 15 and extending crosswise thereof are spaced pairs of track irons 45 and 46 on which the platform 15 rests and which in turn are supported by two main beams 32 and 33 which extend parallelly lengthwise of the platform. Beams 32 and 33 are operatively engaged with the top ends of two pairs of crossing bars 20 that are pivotally interconnected at 22 so as to operate with scissors-like action on the lazy-tongs principle to raise and lower the platform 15.

The top end of each cross bar at the rear end of the truck is pivotally connected at 23 to one of the beams 32 and 33 while the bottom end of each cross bar at the rear end of the truck is pivotally connected at 24 to the side bar of a base frame 25 of the scaffold that is fixed atop the chassis 12. The top end of each cross bar at the front end of the truck is slidably engaged with one of said main beams 32 or 33 by means of a roller 26 which occupies and rides along the inwardly facing channel space of the beam. The bottom end of each cross bar at the front end of the truck is equipped with a corresponding roller 27 that is similarly arranged to occupy and ride along the channel space in the angle irons at opposite sides of base frame 25.

Rollers 26 and 27 are forced to ride horizontally within the channels of their supporting irons in a direction to raise platform 15 by means of three hydraulic cylinders or rams. Two of these rams are designated 28 at the front end of the truck and exert thrust between the base frame 25 and the bottom front ends of the cross bars 20. The other hydraulic cylinder or ram 29 acts to assist the starting movement of the crossing bars 20 by thrusting between a cross rod 30 which extends rigidly from one to the other of bars 20 and a cross rod 31 that extends from one to the other of the side bars of base frame 25.

As other types of adjustable support structure may be employed for elevating platform 15, the present improvements are more particularly concerned with the equipment of platform 15 with catwalks 40 of extendible length which are capable of being projected endwise into the foliage of any normal size of full grown orchard tree, such as an apple tree. These catwalks can be extended sufficiently to reach the tree trunk or at will to various less depths of penetration of the foliage at any height to which the platform 15 may be elevated. There may be four or some other desirable number of separate catwalks 40, each of which can be of the same construction as is shown in detail in FIGS. 1 and 5 of the drawings.

In order to achieve maximum extension of the catwalks 40, while enabling them when desired to be completely withdrawn to within the lateral confines of platform 15, each catwalk comprises an innermost section 41 and an outermost section 42, both of which sections are slidable relatively to the other as well as relatively to the elevatable platform 15. To enable such sections or partial lengths of the catwalk to so function, the outermost end section 42 of each catwalk comprises edge rails 43 which at their extreme outboard end are bent into U-shape to form a rounded terminal of the section. The straight lengthwise stretches of edge rails 43 parallel and lie slidably inside the wider apart edge rails 44 of the innermost end sections 41 of the catwalk, flanking the same in the same horizontal plane. The rounded terminal 49 of the outer catwalk section 42 facilitates the ability of the catwalk to work its way endwise into the midst of tree foliage without becoming blocked or seriously resisted by such twigs and branches as it encounters.

The edge rails 44 of the inner section 41 of the catwalk are confined slidably within mutually facing channels in the aforesaid laterally spaced angle iron tracks 45 and 46 which extend crosswise and support the platform 15 being in turn supported by the main beams 32 and 33 of the platform which extend longitudinally of the truck. The edge rails 43 of the outer section 42 of the catwalk are connected at their innermost ends by a cross bar 50 and also are there equipped with outward projecting spur flanges 51 which underlie respectively the edge rails 44 of the inner section 41 of the catwalk in a manner to be slidable therealong.

The edge rails 44 are connected together at their outermost ends by a cross bar 52 that dips sufficiently under the rails 43 to slidably support the latter while edge rails 43 and 44 occupy the same horizontal plane. The innermost ends of edge rails 44 are rigidly connected by a cross bar 53. Thus it is seen that both the inner section 41 of each catwalk and the outer section 43 of the same catwalk comprise separate elongate rectangular structures spanned by expanded metal sheet 54 and 55 secured to their side rails to serve as footing surface for workmen to walk upon. Preferably the metal sheet is firmly secured, as by welding, to the top surfaces of the rails, in which case the rails 43 may be made slightly smaller in diameter than rails 44 to avoid interference of the sheets during relative sliding of the two sections of the catwalk. For instance, rails 43 may comprise 2½" size pipe and rails 44 comprise 3" size pipe. FIG. 5 shows that even in the most extended condition of the catwalk there is enough telescopic overlapping of its sections 41 and 42 to prevent drooping of the latter when subjected to the weight of a workman.

In FIG. 1 two complete catwalks are shown one of which is fully withdrawn within the side-to-side confines of the width of the platform, and the other of which is half way extended through motivation by a power winch acting on cables trained about pulleys pivotally carried by the catwalk sections 41, 42 and by an underslung saddle bar 56 that extends crosswise beneath the angle iron tracks 45, 46 at the edge of platform 15. Saddle bar 56 and the tracks 45 and 46 are braced by slanting struts 57 that extend from and are welded to the hereinbefore mentioned beams 32 and 33 as best shown in FIGS. 6, 11 and 12.

Two of the aforementioned pulleys 58 and 59 are pivotally carried by the catwalk section 41 and mounted respectively on the cross bars 52 and 53 thereof, while a third pulley 60 is pivotally mounted on the frame stationed saddle bar 56. All of the pulleys lie substantially in the same horizontal plane and just beneath the metal sheet 55 of the catwalks. A belt-like cable 61 is trained about pulleys 58 and 59 and also is fixedly attached to the stationary saddle iron 56 at 65 and to the catwalk cross bar 50 at 66. A second or pulling cable 62 is trained about pulley 60 and as shown in FIG. 1 has one of its ends wound on winch drum 63 which is powered by an electric motor 64 as best shown in FIG. 2. The other end of cable 62 is fixedly attached at 68 to the cross bar 53 of catwalk section 41. A third cable 67 with one end fixedly attached to the catwalk cross bar 53 has its other end wound on winch drum 63 in a direction of winding opposite to that of cable 62.

As cable 62 is drawn in by the winch drum, cable 67 is paid out an equal amount and the cables and pulleys described form a tackle system wherein a given amount of sliding movement of catwalk section 41 imparts to catwalk section 42 twice that amount of sliding movement in either direction.

Motor 64 is a reversible motor and operates through reduction gearing in the spur housing 70 that serves to mount the motor on a support plate 71 fixedly attached to the side wall of one of the track irons 45 or 46. The output shaft 72 of the reduction gearing extends through support plate 71 and carries a sprocket wheel 73 which by means of a link chain 74 drivingly connects sprocket 73 with a sprocket 75 fixed on the spindle 76 of the winch drum 63 whose adjacent end is journaled in a bearing 77 supported by the plate 71. Its other end is journaled in a bearing 78 fixed on the other track iron.

The extent and direction of running of each motor 64 is conveniently controlled at stations preferably located on the side of the platform 15 from which the catwalks can be made to project. FIG. 15 shows two of such control stations at each of which there is a conduit post 84 sheltering electric wires that connect the motor or motors with one or more electric switches encased at the top of the post in a metal box 85. Where there are four separate winch motors as herein, there may be two or more separate switches on each post and each switch can have sufficient circuit making and breaking contacts to stop and start the running of a selected motor in either chosen direction. If the motors are DC reversible motors powered from an ordinary 12-volt automobile storage battery they may draw 100 amperes of current in which case, to avoid the use of electric wiring heavy enough to carry such current, the wires running to switch boxes 84 may serve to energize separate motor controlling relays (not shown) that may be stationed close to the motor that is controlled thereby.

FIG. 15 portrays the unique arrangement of a depository designated 86 as a whole, uniquely arranged as a long relatively narrow and elevated track of rollers 87 supported on platform 15 by legs 90 and extending continuously past the anchored ends of all the catwalks 40 lengthwise of platform 15. This shape and disposition of the depository 86 makes it equally and simultaneously available to all workmen of a crew traveling the catwalks with tote baskets (such as 88) which can be successively emptied into wooden boxes 89 resting on the track rollers 87 until all boxes are filled. The catwalks are then retracted and the platform 15 lowered to its broken line position in FIG. 3.

The boxes 89 on roller track 87 can easily be advanced to and lifted off from the end of roller track 87 at the rear of the truck and progressively placed on the lift fork 92 which when in raised position approximates the level of the top surface of platform 15. When loaded with boxes filled with fruit transferred from roller track 87, the lift fork can be lowered expeditiously to the ground by the hydraulically controlled vertical ram 93 which in like manner can thereafter restore the fork 92 to its raised position ready to receive and lower a subsequent load of the boxes 89. The lift plunger 96 of ram 93 carries on its top end a sprocket wheel 94 over which there is trained a link chain 95 one of whose lower ends is attached to the lift fork 92 and the other of whose ends is fixed to the chassis 12 of the truck. Thus the vertically reciprocable lift fork is caused to travel twice as far and fast as does the ram plunger 96. The fork 92 is guided for vertical movement by roller wheels 101 riding in the channels of uprights 97. Truck chassis 12 carries stationary platforms 98 and 99 whose edges flank the vertical path of movement of lift fork 92 and are protected by railings 100. It is preferable to employ two of the link chains 95 to avoid tendency of the ram plunger to swivel responsively to the pull of a single offset sprocket wheel.

For ready replacement of filled boxes that are removed from roller track 87, the platform 15 has sufficient width at the left side of the roller track to store boxes 102 on the platform when the platform is lowered so that they can handily be transferred to the track at times when the platform is raised ready to be filled with apples freshly picked from the tree.

To prevent sidewise unbalancing of the truck on its wheel base when the catwalks are supporting workmen, retractable prop arms 104, 105 are provided as shown in FIGS. 3 and 4. The stem of each prop arm is shown to be pivotally anchored on a turret cylinder 106 that swivels about the vertical axis of a pintle or pivot shaft 107 supported between chassis carried brackets 108. A relatively powerful ram 109 impels prop arm 104 to swing downward and upward about its pivotal connection to post 106 and by such downward swinging can be made to press against the ground when in outspread position as shown in FIG. 15 and firmly braces the truck chassis against overbalancing. For retracting each prop arm to its position close to the truck chassis as shown in FIGS. 3 and 4, a relatively less powerful ram 110 pivotally connects turret post 106 with the truck chassis 12 so as to cause the turret post to swivel about the pivot shaft 107 and carry with it the prop arm 104 when the latter is lifted free from contact with the ground.

It will not be necessary herein to detail any of many possible systems of hydraulic controls for the rams 28, 29, 93, 109 and 110, whose structural arrangement and functioning has now been described, other than to explain that suitable liquid for operating the hydraulic rams may be stored in a chassis supported reservoir tank 114 under sufficient pressure for operating, through hydraulic conduits (not shown), any and all of the rams as desired. Conduit control valves represented at 116 in FIGS. 1 and 3 can be operated manually, or electrically by means of solenoid action. A suitable hydraulic pump (not shown) may be located under the engine hood 14 and driven by power takeoff (not shown) from the propulsion engine of the truck (not shown). Any particular one of the valves 116, if solenoid operated, can be energized electrically from the storage battery of the truck (not shown) by means of a flexible resiliently contractive current supply cord 117 leading to control switch 118 and long enough to extend to all heights of platform 15 so that it is always within reach of an operator standing on platform 15 in any elevated position of the latter.

For driving the truck to different positions in an orchard adjacent to a fruit tree or row of trees, the truck can be directed by a steering wheel 119 which may be located as indicated in FIGS. 1 and 2 or elsewhere within reach of a person standing on the front end of platform 15 when it is lowered to its broken line position in FIG. 3. Also within easy reach of an operator so stationed, additional truck driving controls are represented schematically in FIG. 3, as for instance a throttle control 120 and a brake control 121 whose connections to the carburetor of the engine and to the brakes at the road wheels may be conventional and are not necessary to have illustration in detail. Likewise it is unnecessary to depict the steering mechanism that connects steering wheel 119 with the tie rod 122 that connects the steering knuckles 123 as is well understood in the art.

In operating my improved mobile scaffold the platform 15 may first occupy its broken line lowered position in FIG. 3. The truck will be driven to any desired position beside a tree or clump of trees so that a crew of workmen can mount the platform for working in the trees. The prop arms 104, 105 are then swung to the supporting positions shown in FIG. 15. By a workman stationed on platform 15 at control switch 118 the platform is then raised to a desired height which may be more or less than that shown in FIG. 3. By means of the control switches 84 each of the catwalks 40 can then be run out from the lateral edge of platform 15 to any desired length of projection from the platform so as to work their way endwise into the foliage of the tree or trees to any selected extent even to the trunk of the tree as illustrated in FIG. 15. Different workmen can then travel the different catwalks simultaneously to desired positions that will place them within easy reach of chosen portions of the tree, as for picking apples or other produce. The thus picked apples can then be carried to the platform 15 along the several catwalks in convenient receptacles such as the tote basket represented at 88 in FIG. 15. Apples so collected from the trees are dumped into individually portable transfer containers such as boxes 89 resting on the rollers 87 of a transfer track 86, which later can easily be shoved toward the rear end of the platform after the latter is restored to its broken line position in FIG. 3. As each box or pair of boxes 89 reaches the rear end of the roller track 86 the boxes can be transferred manually or automatically to a portable wooden pallet 91 which rests removably on the lift fork 92 and which under the control of hydraulic ram 93 will gently lower the pallet and its carried box or boxes of fruit to the ground.

Many variations of the detailed parts and arrangement will be suggested to workers in the art by this disclosure and all such which fall within a broad interpretation of the appended claims are intended to be included in the patent coverage.

What I claim is:

1. In a vehicle borne scaffold affording to a crew of tree tending workmen simultaneous access to selective positions penetrating or flanking a tree at selective heights, the combination of, a vehicle chassis wheeled to roll in traveling direction alongside a tree, a rigid integral platform superimposed on said chassis elongated in said direction of chassis travel and having its overall width bounded by a substantially continuous straightaway edge, a straight row of narrow relatively elongate catwalks spaced apart sidewise along said straightaway edge of the platform, track means on said platform guiding said catwalks to move endwise in mutually parallel paths substantially perpendicular to said straightaway edge of the platform, and means to cause said movements of said catwalks independently to selective extents of projection outboard of the overall width of the platform, whereby any selected portion of the length of the platform can be presented to the tree and catwalks selected at will can be projected into or in flanking relation to the spread of the branches of the tree.

2. In a vehicle borne scaffold, the combination defined in claim 1, in which the said means to cause the said movements of the said catwalks comprises a source of power mounted on said platform operably controllable to act in either of reverse directions, and a system of pulleys in part on said platform and in part on each of said catwalks, together with cable anchored to and trained about said pulleys and connected to said source of power in a manner to transmit motion separately and positively from said source to each of said catwalks in either of said reverse directions whereby to vary at will the said extent of projection of said catwalk from said platform.

3. In a vehicle-borne scaffold as described in claim 1, the combination defined in said claim, in which at least one of the said catwalks comprises, relatively movable longitudinally lapping sections including a relatively slow moving innermost section and a relatively fast moving outermost section, means to maintain each of said sections in a constant plane of movement with the innermost end of said outermost section intermediate the two ends of said innermost section, a pulley on each of the said two ends of said innermost section, a beltlike cable trained about both of said pulleys and secured to both the said platform and said outermost section, a third pulley pivotally mounted on said platform, a pulling cable secured to said innermost end of said innermost section and trained about said third pulley, and a prime mover operatively connected to said innermost catwalk section and to said pulling cable in a manner to impel said innermost section in either lengthwise direction, whereby travel of said innermost section in either lengthwise direction will cause a relatively greater extent of travel of said innermost section in a like direction.

4. In a vehicle-borne scaffold as described in claim 3, the combination defined in said claim, in which the said prime mover includes a winch drum on which is wound the said pulling cable, together with a retrieving cable wound on said drum and secured to the said innermost catwalk section.

5. In a vehicle-borne scaffold as described in claim 4, the combination defined in said claim, in which the said prime mover includes a reversing electric motor connected to drive the said winch drum selectively in opposite rotary directions, together with a motor reversing electric circuit controller located within operating reach of an operator stationed on the said platform in position to view the movements of the said catwalks.

References Cited

UNITED STATES PATENTS

| | | | |
|---|---|---|---|
| 803,717 | 11/1905 | Schwarz et al. | 182—62.5 |
| 849,222 | 4/1907 | Fleming | 182—62.5 |
| 2,647,525 | 8/1953 | Duda | 214—83.1 |
| 2,750,204 | 6/1956 | Ohrmann | 182—17 |
| 2,825,573 | 3/1958 | Shaw et al. | 214—83.1 |
| 2,935,218 | 5/1960 | Fritz | 182—63 |
| 3,023,831 | 3/1962 | Bevis | 182—141 |
| 3,031,027 | 4/1962 | Mitchell | 182—62.5 |
| 3,110,476 | 11/1963 | Farris | 182—141 |
| 3,250,343 | 5/1966 | Maloney | 182—2 |
| 3,273,667 | 9/1966 | Hiyama | 182—129 |
| 3,311,191 | 3/1967 | Hiyama | 182—131 |

REINALDO P. MACHADO, *Primary Examiner.*